United States Patent
Schlesch et al.

[19]

[11] Patent Number: 5,947,145
[45] Date of Patent: Sep. 7, 1999

[54] COMBINATION STEAM TRAP AND FLOW VALVE ASSEMBLY

[75] Inventors: Ronald D. Schlesch; Charles M. Reynolds; Steven O. Smith, all of Three Rivers, Mich.

[73] Assignee: Armstrong International, Inc., Three Rivers, Mich.

[21] Appl. No.: 08/870,229

[22] Filed: Jun. 6, 1997

[51] Int. Cl.[6] ........................................ F16T 1/00
[52] U.S. Cl. ........................................ 137/182; 137/185
[58] Field of Search ..................... 137/182, 185

[56] References Cited

U.S. PATENT DOCUMENTS

| | | |
|---|---|---|
| 722,650 | 3/1903 | Brainerd .................................. 137/182 |
| 985,362 | 2/1911 | McKeown ................................. 137/182 |
| 4,149,557 | 4/1979 | Keech et al. . |
| 4,508,135 | 4/1985 | Schlesch et al. . |
| 5,065,785 | 11/1991 | Deacon et al. . |

OTHER PUBLICATIONS

"Piping Kings" *Plenty Steam Traps* brochure, published pre–Jun. 6, 1996 (8 sheets).
"Trouvay & Cauvin", *The Piston Valve*, brochure pp. 8–12, published pre–Jun. 6, 1996 (5 sheets).
"Trouvay & Cauvin" *PPC Compact Drain Manifold*, pp. 8–13 to 8–15, published pre–Jun. 6, 1996 (2 sheets).

*Primary Examiner*—Gerald A. Michalsky
*Attorney, Agent, or Firm*—Flynn, Thiel, Boutell & Tanis, P.C.

[57] ABSTRACT

A combination steam trap and flow valve assembly including a compact housing having a steam trap chamber, valve chambers, a cover, and a body. The steam trap and valve chambers are integrally formed within the body to create a compact integral assembly. Valve assemblies are received in the valve chambers to control the flow of steam and/or condensate into and out of the assembly. A steam trap mechanism is positioned within the steam trap chamber and the valve unit of the steam trap mechanism being positioned in the cover. The cover is removably attached to the uppermost surface of the body. Passages are provided in the body and cover thereby allowing the flow of steam and/or condensate to the steam trap chamber.

33 Claims, 11 Drawing Sheets

COMBINATION STEAM TRAP AND FLOW VALVE ASSEMBLY

FIELD OF THE INVENTION

This invention relates to a combination steam trap and flow valve assembly.

BACKGROUND OF THE INVENTION

In steam supply systems it is known to provide a steam trap in a steam line flanked by on/off valves wherein the on/off valves are connected by conventional plumbing fittings respectively to the inlet and outlet ports of the steam trap and by further conventional fittings to flanking ends of steam pipes defining upstream and downstream parts of such steam line. The valves are normally open during operation of the steam system but can be closed manually to shut-off steam flow and allow repair or replacement of the steam trap.

Applicant has found that such a plumbing arrangement is expensive, in terms of parts cost and labor expenditure, to install and is relatively bulky so as not to fit conveniently into a spacially crowded steam system.

Also known is a commercially available unit sold under the tradename "PIPING KINGS" available from U.S.A. Plenty, Inc. of Houston, Tex., in which a pair of on/off valve housings are sidewardly spaced from opposite sides of a steam trap housing and connected thereto by elongate conduits. The valve housings have respective steam inlet and outlet ports. The length axes of the trap chamber, valve chambers, conduits and ports are all substantially coplanar in at least one embodiment of the device and the sideward spacing of the valve housings from, and on opposite sides of the trap housing, results in a mechanically complex and space consuming system. In addition, the valve housings are configured each with length axis thereof acutely angled with respect to the length axis of their respective port (inlet or outlet) and the corresponding conduit by which they connect to the trap housing, such that the length axes of the valve housings converge with respect to each other and with respect to the length axis of the trap chamber in a manner to even further space apart the actuating handles of the on/off valves and thereby further increase the space required by the apparatus.

The present invention is intended to overcome these prior art disadvantages and provide new advantages, as will be apparent to persons acquainted with an apparatus of this general kind, upon reading the following description and inspecting the company drawings.

SUMMARY OF THE INVENTION

The objects and purposes of the invention are met by providing a combination steam trap and flow valve assembly compactly arranged in a common housing.

BRIEF DESCRIPTION OF THE DRAWINGS

Other objects and purposes of this invention will be apparent to persons acquainted with apparatus of this general type upon reading the following specification and inspecting the accompanying drawings.

DETAILED DESCRIPTION

Figure 1:
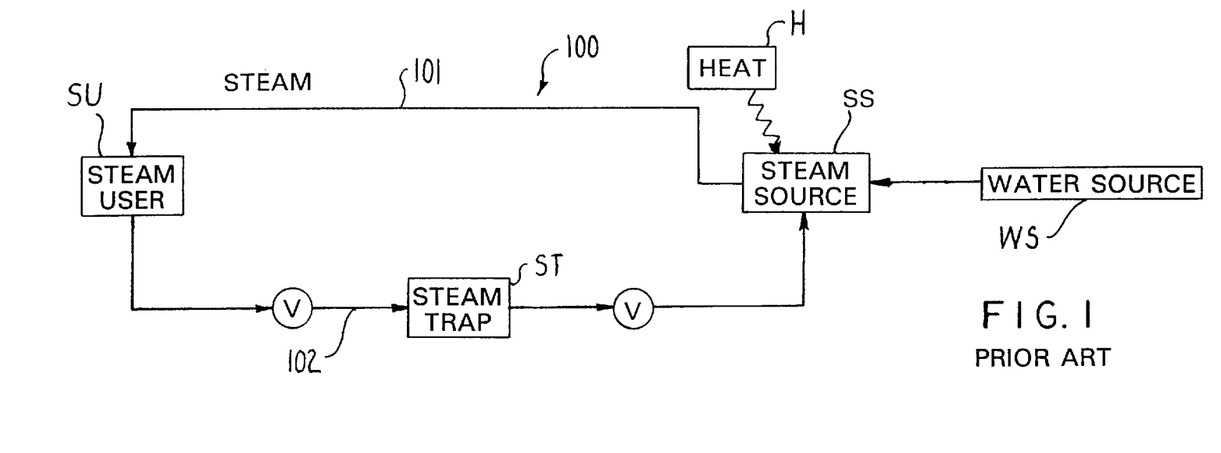
FIG. 1 is a simplified schematic diagram of a typical steam system of the type in which a steam trap, flanked by on/off valves, may be employed.

FIG. 1 schematically illustrates a simplified steam system 100. The steam system 100 has a steam source SS to which heat H is applied to convert water supplied from a water source WS into steam. The steam is supplied from the steam source through a steam line 101 to a steam user SU. A drain line 102 is connected in parallel with the steam line 101 from the steam user SU to the steam source SS. The drain line 102 includes a steam trap ST and valves V located in the drain line 102, with one valve on the inlet or upstream side of the steam trap and one valve on the outlet or downstream side of the steam trap ST.

Figure 3:
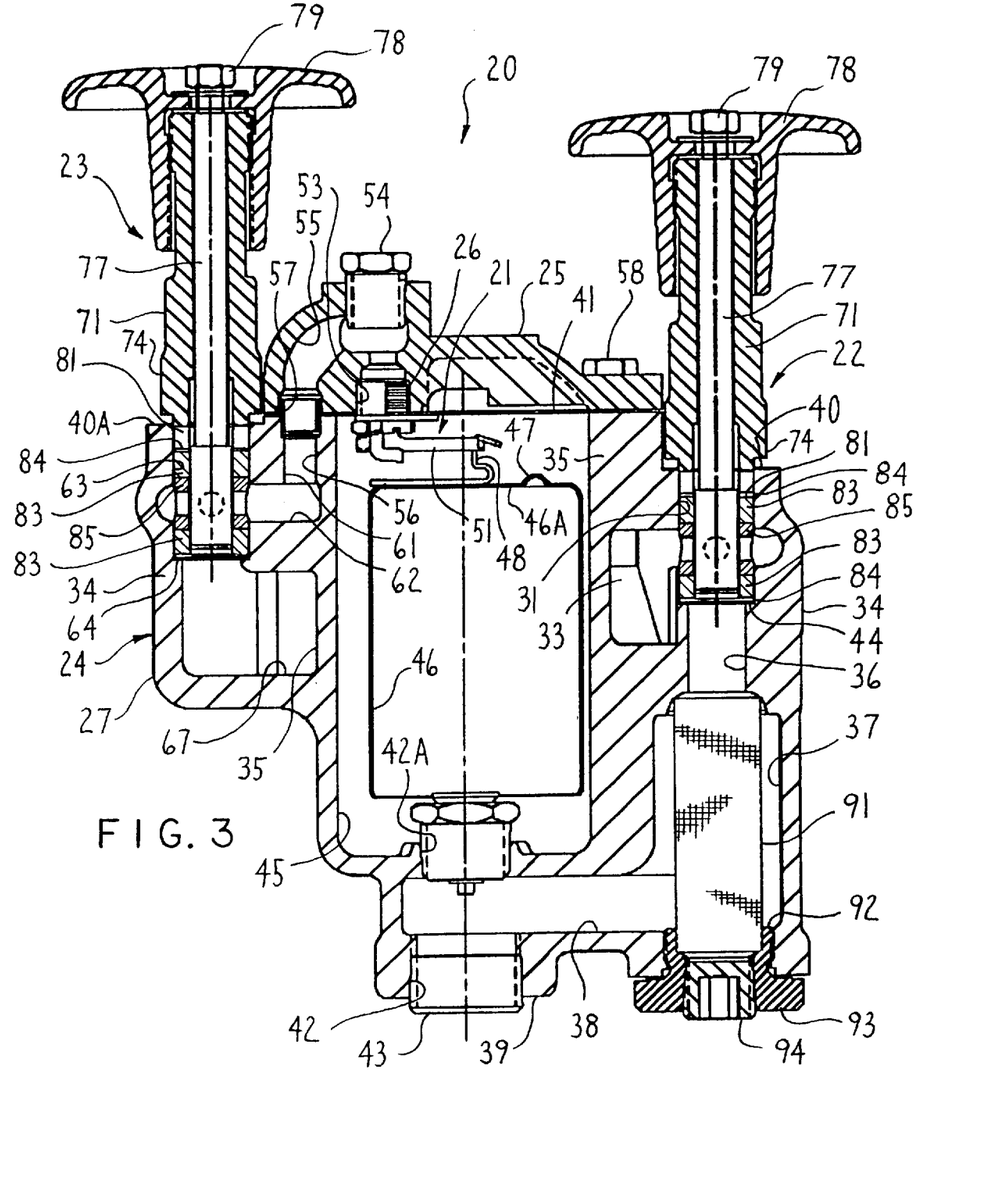
FIG. 3 is a central cross-sectional view substantially taken on the line 3-3 of FIG. 2, with valve handles added.

FIG. 3 shows a combination steam trap and flow valve assembly 20 embodying the invention. The assembly 20 includes a steam trap mechanism 21, inlet valve assembly 22, and outlet valve assembly 23, all mounted in a unitary housing 24. The housing 24 includes a body 27 and a cover 25 mounted on the top of the body 27. An automatic trap valve unit 26 of the steam trap mechanism 21 is mounted within the cover 25.

An inlet valve chamber 31 is formed in the housing 24 and communicates with an inlet port 32 partially defining a U-shaped passage 33. An outer wall 34 and inner wall 35 of the housing 24 define the inlet valve chamber 31 which has a generally upright, cylindrical shape extending longitudinally along and positioned on a lateral side of the assembly 20. The inlet valve chamber 31 partially defines the U-shaped passage 33. The inlet valve chamber 31 has a generally uniform upright section 36 which fluidly connects to a lower, enlarged part 37. The upright section 36 has an annular step 44 therein. The enlarged part 37 connects to a lateral passageway 38 positioned within a lower wall 39 of the body 27. The inlet valve chamber 31 opens upwardly through a radially, outwardly extending flange portion 40 of the body 27. The flange 40 is positioned downwardly from a topmost surface 41 of the body 27.

A plug aperture 42 extends through the lower wall 39 and fluidly communicates with the lateral passage 38. A plug 43 seals the aperture 42 against leakage of steam or water through the aperture 42.

A steam trap void or chamber 45 is positioned within the housing 24 generally enclosed by the inner wall 35 and partly enclosed by outer wall 34. The inlet valve chamber 31 and inlet valve assembly 21 closely flank the steam trap chamber 45. The steam trap chamber 45 has a generally cylindrical shape with the lateral passage 38 fluidly communicating upwardly into the steam trap chamber 45 through an aperture 42A providing a fluid communication path between the lateral passage 38 and the steam trap chamber 45. The steam trap chamber 45, aperture 42A, and plug aperture 42 are generally coaxial.

The structural features of the steam trap mechanism are discussed in U.S. Pat. Nos. 4 149 557, 4 508 135 and 5 065 785, all assigned to the Assignee of the present invention and are herein incorporated by reference. A brief description of the steam trap mechanism 21 is provided hereafter. The steam trap mechanism 21 is positioned at an upper end of the steam trap chamber 45 and includes an inverted bucket 46 positioned within the steam trap chamber 45. The open end of the inverted bucket 46 is positioned over aperture 42A. The inverted bucket 46 has an outlet orifice 47 offset from the center in the top 46A thereof. The outlet orifice 47 allows excess steam to escape through the outlet orifice 47 from the inverted bucket 46 which accumulates steam and condensate flowing through the aperture 42A from the passage 38. A generally S-shaped hook 48 is fixedly secured to the top 46A, allowing the inverted bucket 46 to be connected to a lever arm 51 of the trap valve unit 26.

A trap valve recess 53 is located in the cover 25, laterally offset from the center thereof, and eccentrically positioned relative to the steam trap chamber 45 when the cover 25 is secured to the body 27. The trap valve recess 53 threadedly receives the trap valve unit 26 therein. A plug 54 seals the recess 53 and allows ready access into the recess 53. An outlet passageway 55 extends curvedly and laterally outwardly from the trap valve recess 53 in fluid communication therewith so that when the trap valve unit 26 is activated by the displacement of the inverted bucket 46 within the steam trap chamber 45, the trap valve unit 26 opens to allow steam and condensate flow through the trap valve recess 53 and outlet passageway 55. The trap valve recess 53 and outlet passageway 55 have a generally inverted U-shape with the outlet passageway 55 opening into the trap valve recess 53 between the trap valve unit 26 and plug 54.

Figure 4:
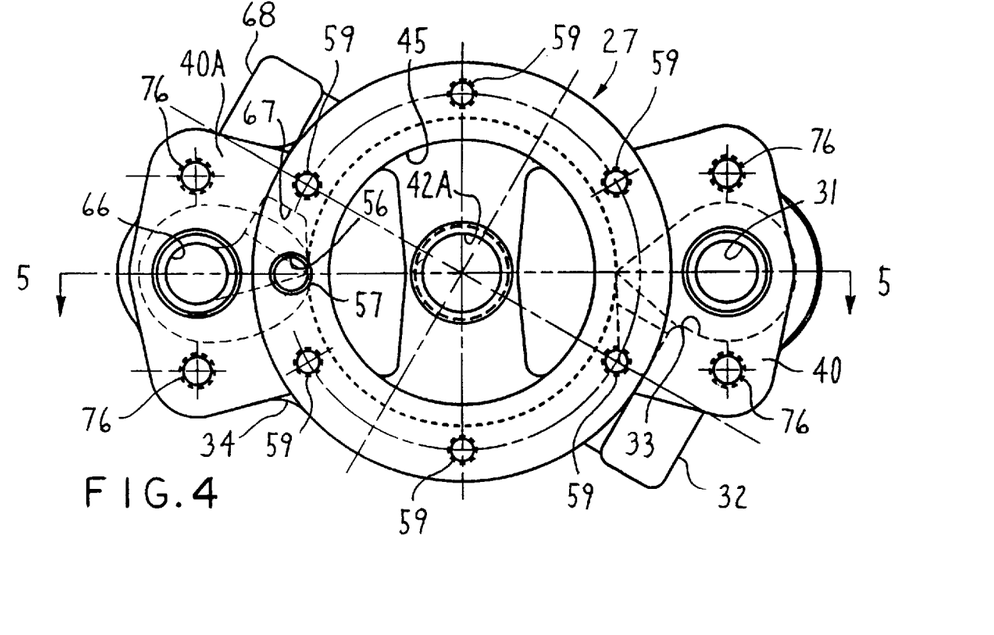
FIG. 4 is a top view of the housing body of FIG. 3.

Screws 58 (FIG. 3) fixedly secure the cover 25 onto the topmost surface 41 of the body 27. The screws 58 conventionally thread into holes 59 (FIG. 4) in the housing 24.

Figure 5:
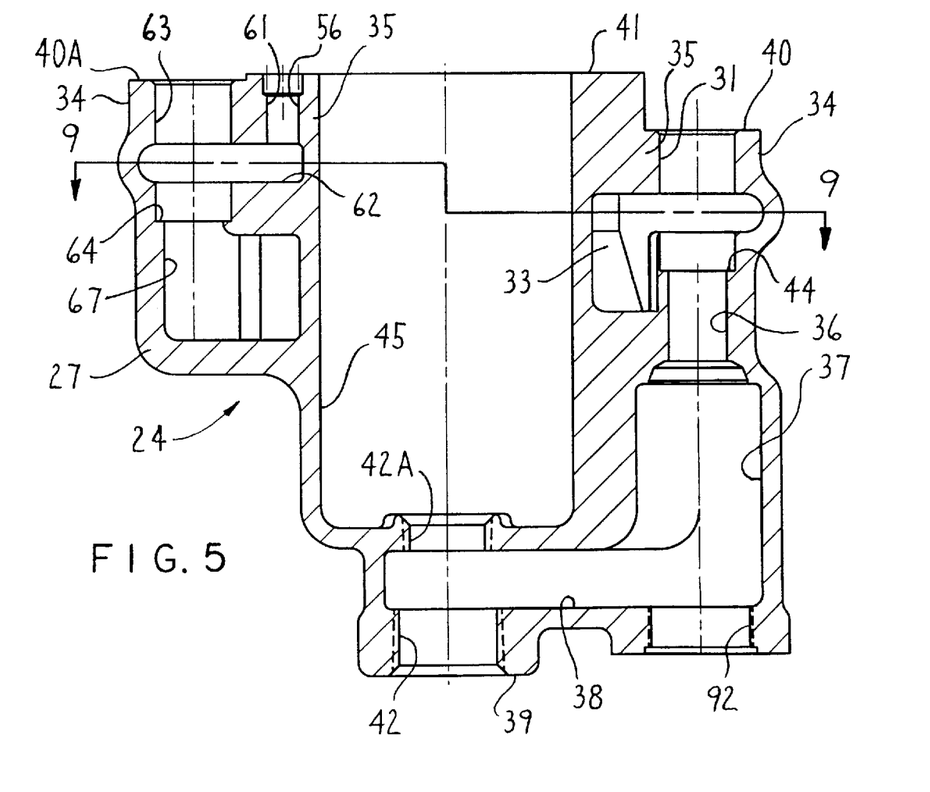
FIG. 5 is a central cross-section view taken on the line 5—5 of FIG. 4 and substantially corresponding to FIG. 3.

A passage 56 (FIG. 3) is positioned within the body 27 in fluid communication with the outlet passageway 55 closely flanking the steam trap chamber 45. The passage 56 extends through the inner wall 35 (FIG. 5). A tubular seal member 57 is positioned between and extending into both the passageway 55 in the cover 25 and the passage 56 in the body 27 to provide a quality seal therebetween.

The passage 56 (FIG. 3) has an upright portion 61 in fluid communication with a laterally extending portion 62. An outlet valve chamber 63 is positioned within the housing 24 laterally spaced from the passage 56 closely flanking the steam trap chamber 45. The lateral portion 62 of the passage 56 is fluidly connected with the outlet valve chamber 63. The outlet valve chamber 63 has an annular step 64 positioned therein just below the intersection of the chamber 63 and lateral portion 62. The outlet valve assembly 23 is received within the outlet valve chamber 63 for controlling the outlet flow of the steam and condensate through the passage 56. The outlet valve chamber 63 is positioned between the outer wall 34 and inner wall 35.

When the outlet valve assembly 23 is open, it allows steam and condensate to flow from the lateral portion 62 of the passage 56 downwardly into a U-shaped passage 67 which is connected to an outlet port 68.

The inlet valve assembly 22, the outlet valve assembly 23, and the trap valve unit 26 are all positioned within the same plane extending through the steam trap with assembly 20. The steam trap with integral valve assembly 20 has a greater length along this plane than a width measured in a plane intersecting the first plane generally transverse therewith.

The inlet valve chamber 31, outlet valve chamber 63, and steam trap chamber 45 are positioned such that the length axes of these three elements lie generally within a single plane extending longitudinally through the steam trap with integral valve assemblies 20. The ports 32, 68 have length axes which intersect the single plane at acute angles thereto.

Figure 6:
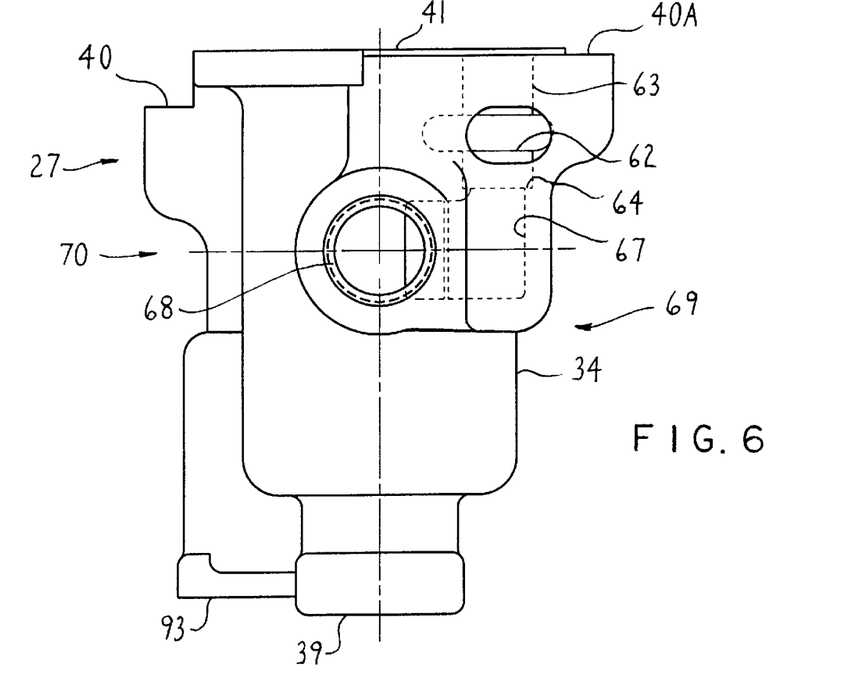
FIG. 6 is a side elevational view taken from the right side in FIG. 4.
Figure 7:
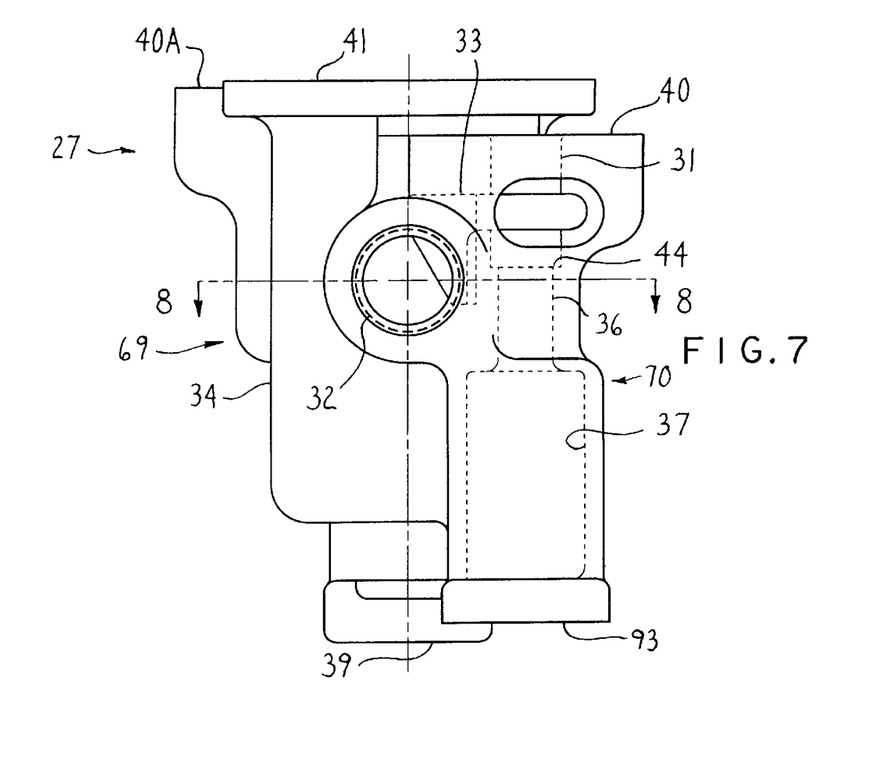
FIG. 7 is a side elevational view taken from the left in FIG. 4.
Figure 8:
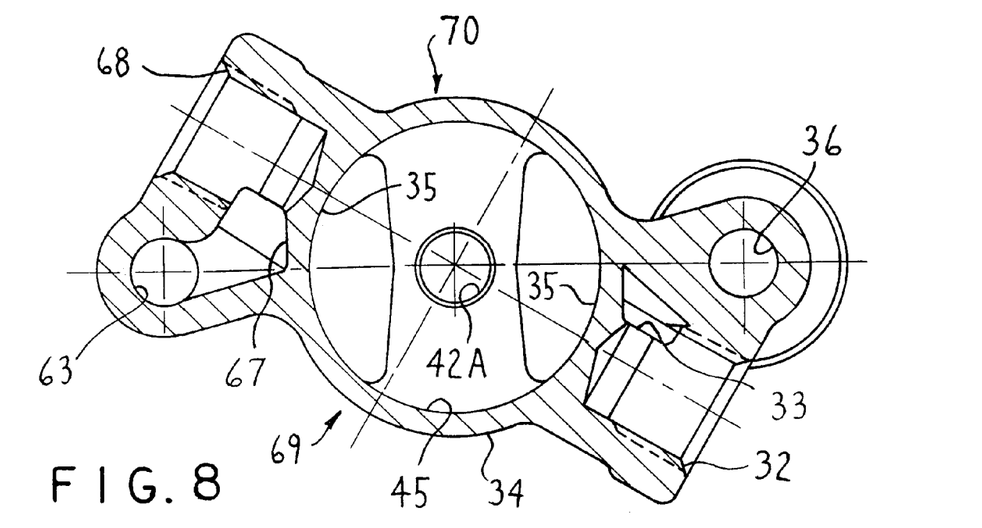
FIG. 8 is a cross sectional view taken on the line 8—8 in FIG. 7.
Figure 9:
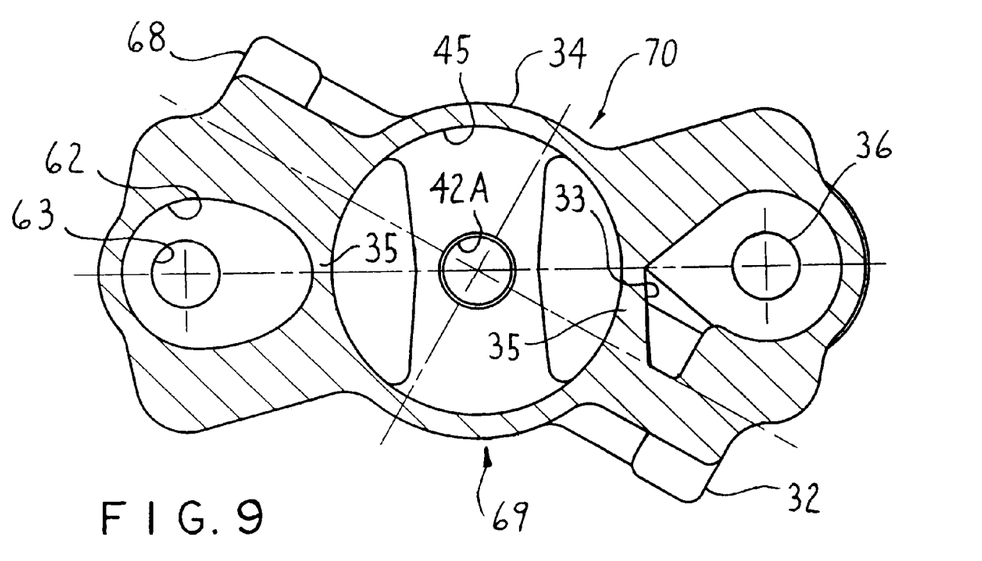
FIG. 9 is a sectional view taken on the line 9—9 of FIG. 5.

The U-shaped passage 33 (associated with the inlet valve chamber 31) and the U-shaped passage 67 (associated with the outlet valve chamber 63) are positioned on opposing longitudinal sides within the housing 24 such that they do not lie within the same plane extending horizontally through the housing 24. Thus the valve assemblies 22, 23 must be seated at different depths within the body 27 to properly control the flow of steam and condensate therethrough. The outlet valve assembly 23 seated on flange 40A of the body 27 is positioned upwardly relative to the flange 40 on which the inlet valve assembly 22 is seated. For ease of manufacture, both valve assemblies 22, 23 may be identically structured. Thus, the handles of the valve assemblies are offset relative to each other in height. However, the cover 25 and valve assemblies 22, 23 could be mounted on the same horizontal plane if desired. The passages 33, 67 extend circumferentially at least partway around the trap chamber 45 and hence the body 27 so as to position the respective ports 32, 68 circumferentially spaced from the inlet or outlet valve chamber 31, 63. The body 27 has front and rear faces 69 and 70 positioned between the inlet and outlet ports 32, 68 (FIGS. 6, 7).

Figure 2:
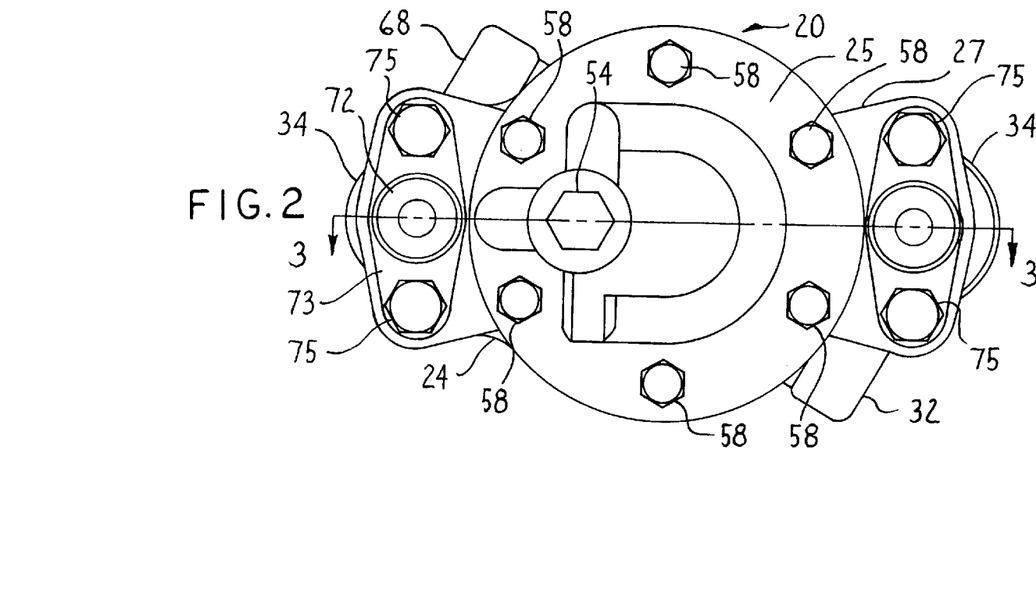
FIG. 2 is a top view of an apparatus embodying the invention, without valve handles.
Figure 10:
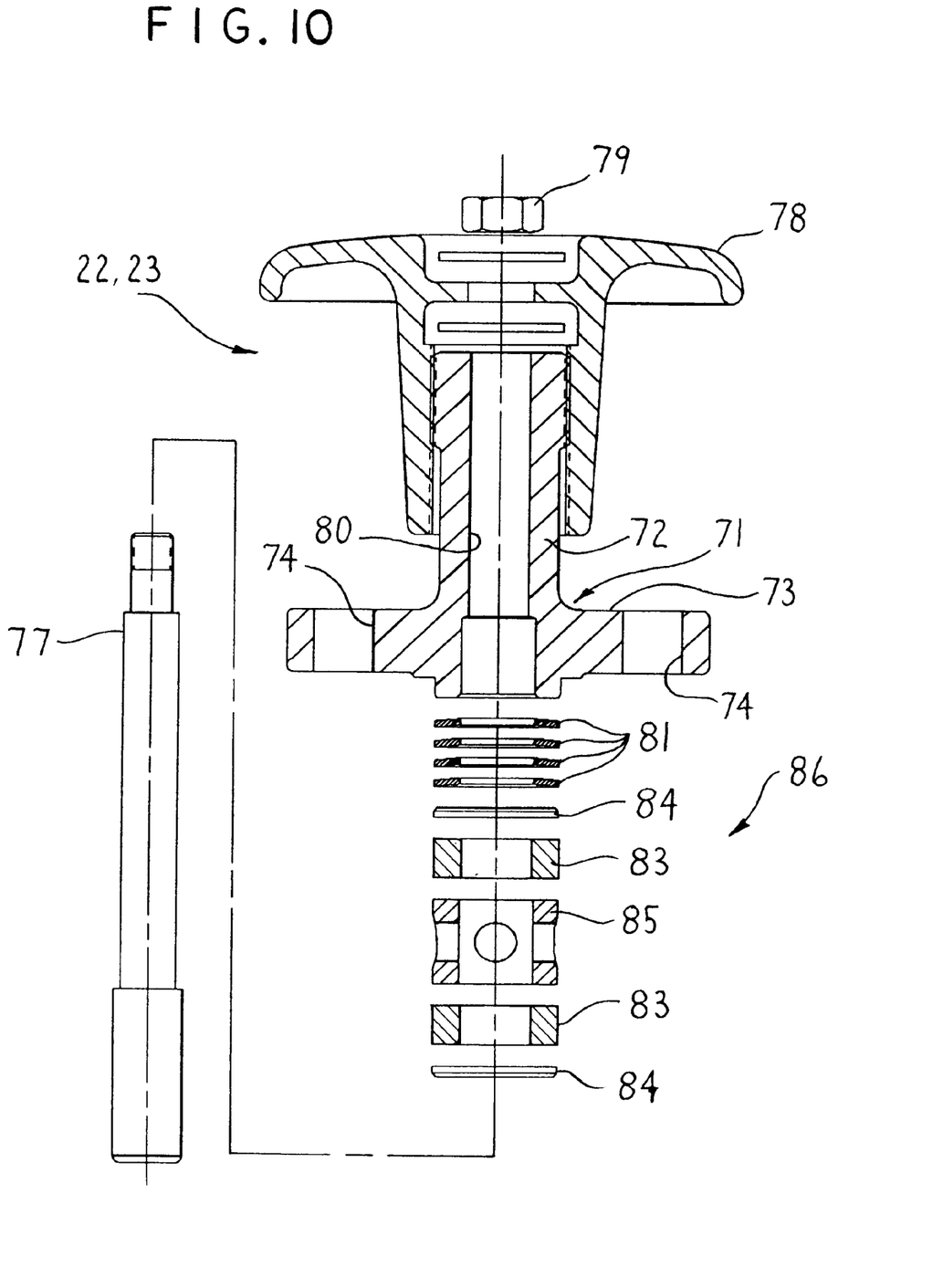
FIG. 10 is an exploded view of a valve assembly utilized in the invention.
Figure 11:
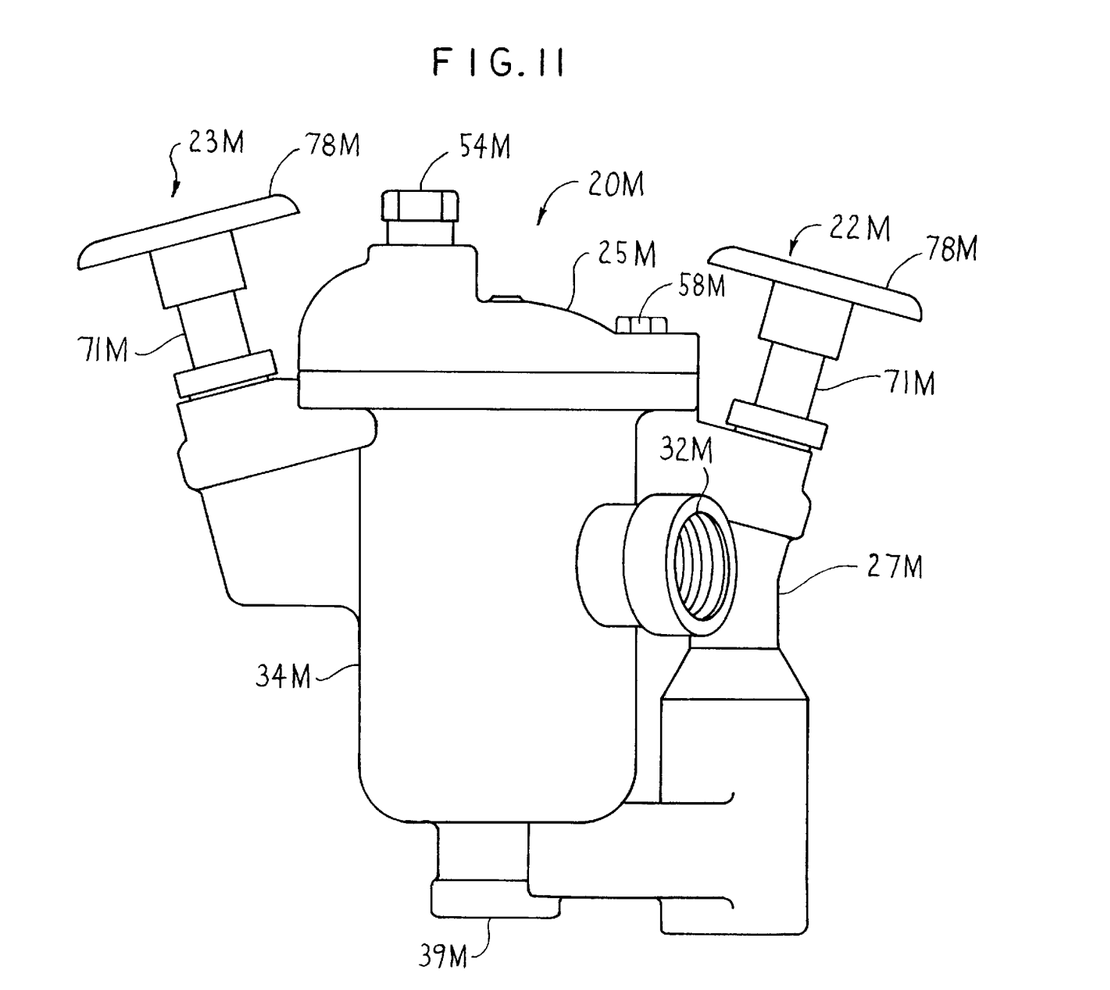
FIG. 11 is a side elevational view of a modification of the present invention apparatus.

The valve assemblies 22, 23 are preferably identical, and one is shown in FIG. 10. The FIG. 10 valve assembly includes an elongate valve guide 71, which has a coaxial bore 80, a hollow elongate portion 72, and a transverse portion 73. The transverse portion 73 extends radially outwardly adjacent the lower end of the elongate portion 72 and has apertures 74 therein. The apertures 74 receive screws 75 (FIG. 2) therethrough to fix the respective valve assembly 22, 23 to the body 27. The screws 75 of the valve assembly 22, 23 thread into holes 76 (FIG. 4) in its respective housing flange 40, 40A.

A valve stem 77 extends through the central bore 80 of the elongate portion 72 of the valve guide 71 and into the respective valve chamber 31 and 63. Thus the stems 77 are positioned coaxially within the inlet and outlet chambers 31, 63 and extend generally perpendicular to a plane containing the top surface 41 of the body 27 whereat the cover 25 is joined to the body 27. A hollow hand wheel 78 axially adjustably threads onto the upstanding elongate portion 72 of the valve guide 71. A nut 79 coaxially fixes the valve stem 77, at its top end, pendently in and to the hand wheel 78.

The valve chamber 31, 63 is cylindrical and receives in axially clamped relation, between the bottom annular step 44, 63 and the overlying valve guide 71, a valve unit 86 including in coaxially attached relation and running from the top in FIG. 10 downward:

(1) springy seal washers 81, (2) a top retainer washer 84, (3) a cylindrical annular seal 83, (4) a tubular valve element 85 having diametral flow bores (here four in number), (5) a further annular seal 83, and (6) a bottom retainer washer 84.

The valve element 85 is in communication with the U-shaped passage 33, 67. The valve assemblies may be conventional, for example the Model TCM valve assembly made by Touvay and Cauvin, and available from the Assignee of the present invention.

An optional tubular screen 91 is fixed in the enlarged part 37 of the inlet valve chamber 31 to filter incoming fluid. The screen 91 is seated at its bottom within a sealing cap 93 which is threaded into an aperture 92 in the lower wall 39 of the body 27 and closed by a plug 94. The screen 91 is here co-axial with the inlet valve chamber 31 and inlet valve assembly 22.

OPERATION

The assembly 20 may be installed in a steam system, like the one shown schematically at 100 in FIG. 1 in place of three separate elements, namely trap ST and the two valves V, as by conventionally connecting the inlet port 32 to the line exiting the steam user 54 and the outlet port 63 to the condensate return line on the side toward the steam source in FIG. 1. Steam and condensate flow into the inlet port 32 through the U-shaped passage 33 past the open inlet valve assembly 22 downwardly through the upright section 36 of the inlet valve chamber 31. The steam and condensate flow passes through the screen 91 in the enlarged part 37 of the upright section to filter out any particulates from the steam and condensate flow, which then passes through the lateral passageway 38 extending through the lower part of the assembly 20 to the steam trap chamber 45.

The steam and condensate flows upwardly into the steam trap chamber 45 through aperture 42A. The steam trap mechanism operates in a conventional manner, for example as described in Assignee's U.S. Pat. Nos. 4 149 557, 4 508 135 and 5 065 785. The inverted bucket 46 thus periodically activates the automatic trap valve 26 so that the trapped condensate within the steam trap chamber 45 exits through the outlet passageway 55 downwardly into the outlet passage 56 in the body 27. The exited condensate flows through the laterally extending portion 62 of passage 56 toward the outlet valve assembly 23. The open outlet valve assembly 23 allows the condensate to pass into the lower part of the outlet valve chamber 63. The condensate flows down into the U-shaped passage 67 and exits through the outlet port 68 to the condensate return line of the steam system 100 toward the steam source.

Maintenance can be performed on the assembly 20 without having to remove it from system 100, to do so both valve assemblies 22, 23 are closed by turning the handles 78. Thus the steam and condensate will not flow into the steam trap chamber 45. This protects maintenance personnel from possible steam burns. The bolts 58 holding the cover 25 on the body 27 are then removed. The cover 25 is lifted upwardly off the top surface 41 of the body 27 until the lever arm 51 can be removed from the S-shaped hook 48 by the maintenance personnel. Then the cover 25 may be slid laterally (into or out of the page in FIG. 3) from under the handles 78 and be completely removed, to allow access to the trap chamber 45 and bucket 46, without removing the body 27 from the adjacent plumbing of the system 100.

The automatic trap valve unit 26 and screen 91 can be similarly accessed by simply closing the valves 22 and 23 and removing the cover 25 or sealing cap 93, respectively.

MODIFICATION

A modified assembly 20M is shown in FIGS. 11–17. Parts of the modified assembly 20M, essentially similar to parts of the above described assembly 20, are identified by the same reference numerals with the suffix M added. The assemblies 20 and 20M are essentially similar except as described below.

In modified assembly 20M, the housing 24M (FIG. 12) angles the longitudinal axes of the inlet valve chamber 31M and outlet valve chamber 63M such that the valve assemblies 22M, 23M extend slightly radially outwardly or slightly off vertical axis from the longitudinal axis of body 27M at acute angles thereto and outwardly from the top surface 41M, on which the cover 25M is removably fixed.

Figure 12:
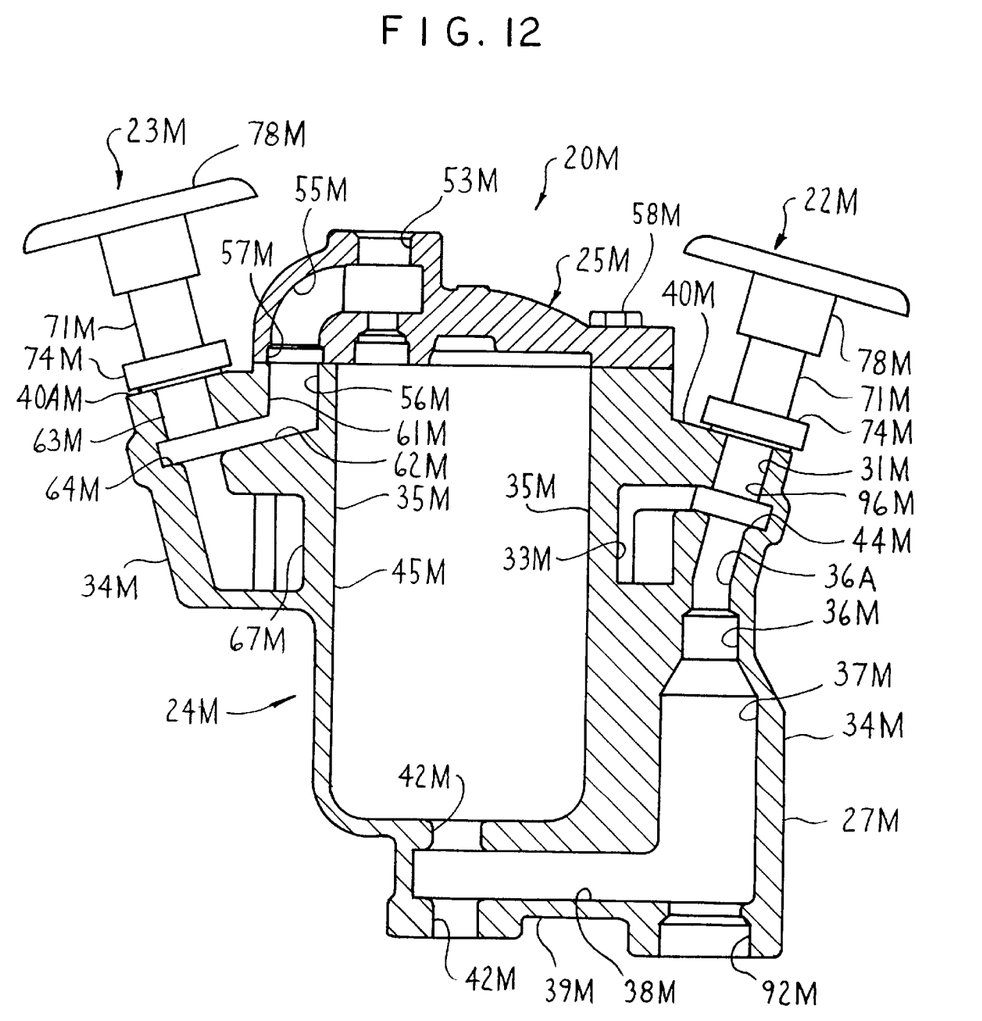
FIG. 12 is an elevational cross sectional view of the FIG. 11 apparatus.
Figure 13:
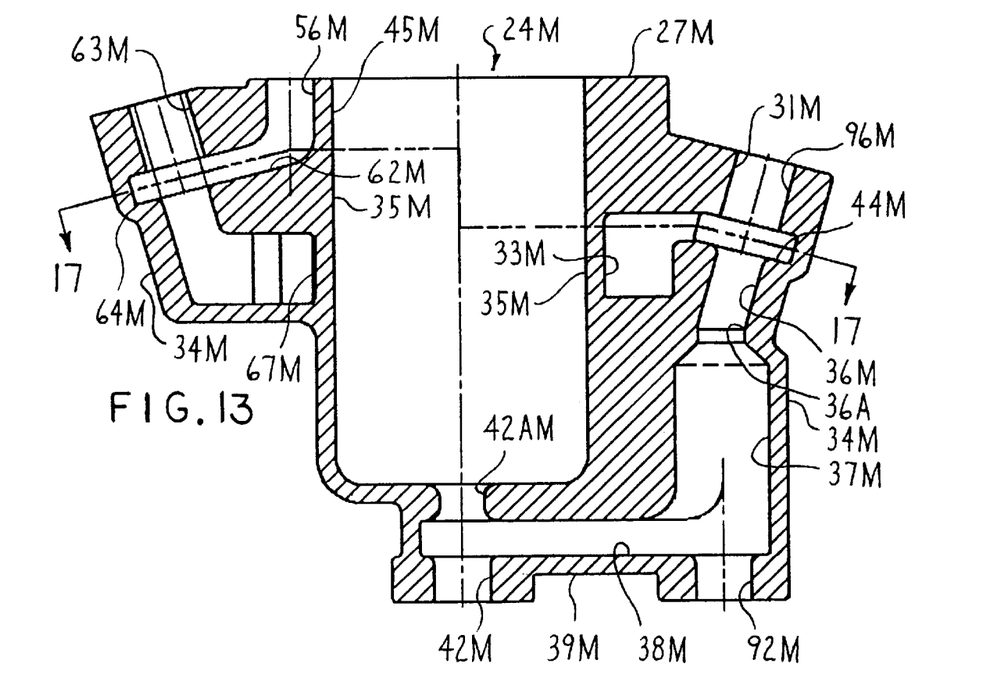
FIG. 13 is a view similar to FIG. 12 but only showing the housing base body of the FIG. 11 apparatus.
Figure 14:
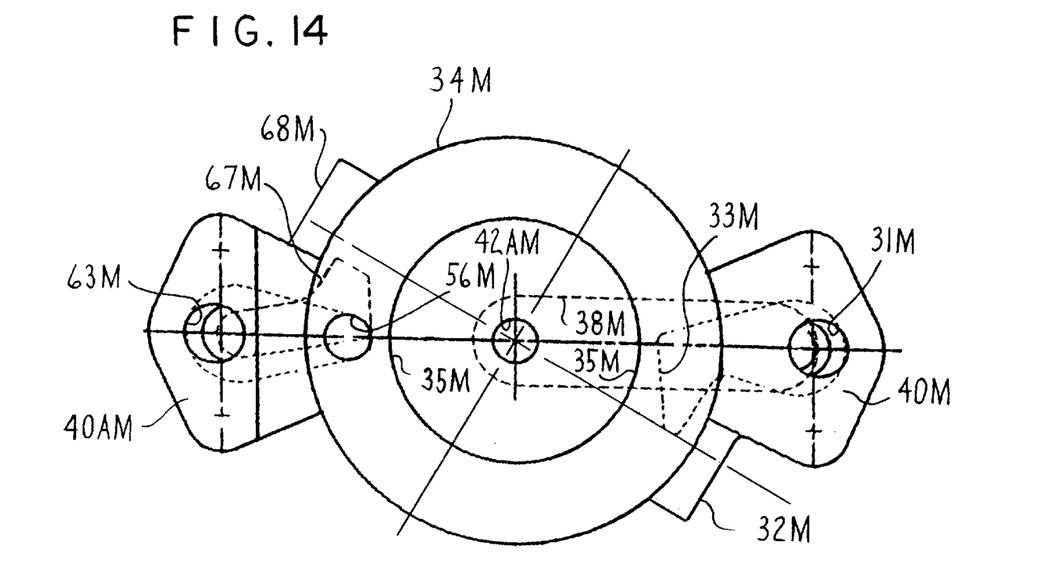
FIG. 14 is a top view of the FIG. 11 apparatus.
Figure 15:
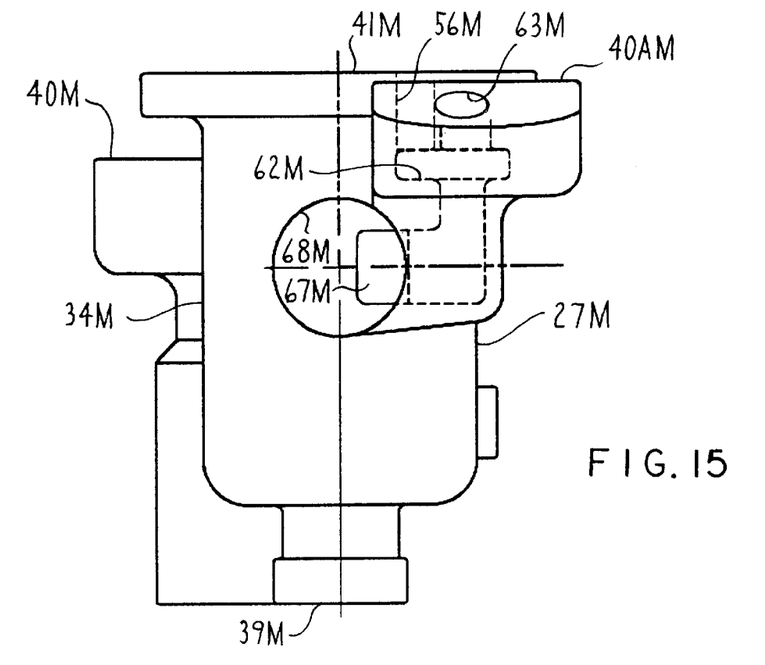
FIG. 15 is an elevational left side view of the FIG. 11 apparatus.
Figure 16:
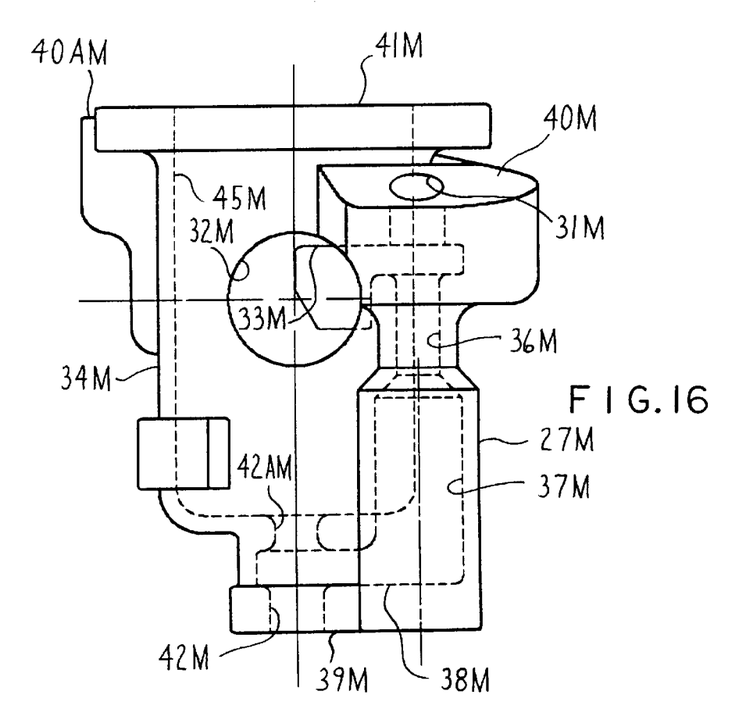
FIG. 16 is an elevational right side view of the FIG. 11 apparatus.
Figure 17:
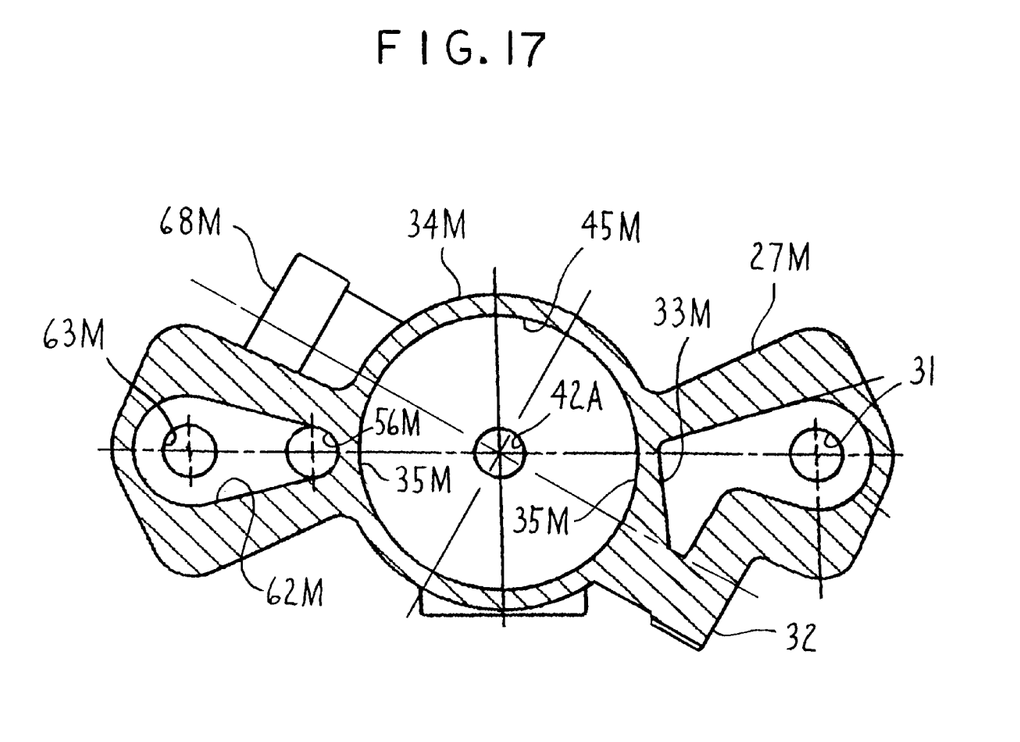
FIG. 17 is a view taken along line 17—17 in FIG. 13.

The inlet valve chamber 31M is angled at the upper end thereof by the upright section 36M having a bend 36A therein below the inlet valve assembly 22M generally coplanar with the bottom surface of the U-shaped passageway 33M associated with the inlet valve chamber 31M. The bend 36A is positioned upstream from the enlarged part 37M receiving the screen 91M therein. The flange 40M is acutely angled to the topmost surface 41M of the body 27M as it is preferably perpendicular to the longitudinal axis of the inlet valve chamber 31M, in particular the upper portion 96M of the upright section 36M.

The longitudinal axis of the outlet chamber 63M is acutely angled relative to the upright, longitudinal axis of the housing 24M. Such that the longitudinal axis of the outlet chamber 63M is slightly off vertical. The passage 62M extends parallel to flange 40AM to ensure that it remains perpendicular to the length axis of outlet chamber 63M.

As a result of the inlet and outlet chambers 31M, 63M extending slightly radially outwardly at the top of the housing 24M, the handles 78M on valve assemblies 22M and 23M are further laterally spaced from each other than in the FIG. 2-9 embodiment. This allows better access to the cover 25M and trap valve unit (not shown but similar to valve unit 26 of FIG. 3) because the handles 78M do not overlie the cover 25M. Further, each handle 78M can be more easily gripped without the user's hand brushing the adjacent handle.

In the modified assembly 20M (FIGS. 11-17), the cover 25M can be raised directly off the top surface 41M of the body 27M after removing screws 58M with the S-shaped hook and inverted bucket still being connected (not shown but similar to hook 48 and bucket 46 in FIG. 3). Thus the whole steam trap mechanism can be removed and replaced with a previously prepared new cover so that down time (time when the valves are closed) is kept to a minimum.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A compact combination steam trap and flow valve assembly comprising:

a hollow housing including a compact body having inlet and outlet ports, and first and second valve chambers, and a trap chamber between and flanked by said valve chambers, said first valve chamber and trap chamber sharing a first common wall of said body, said second valve chamber and trap chamber sharing a second common wall of said body, said common walls being on opposite sides of said trap chamber;

first and second valve assemblies in said first and second valve chambers respectively for controlling flow therethrough;

a steam trap mechanism operatively associated with said trap chamber for controlling flow therethrough;

passages in said body communicating said trap chamber and valve chambers and ports.

2. The apparatus of claim 1 in which said ports are coaxial and open sidewardly from said body, the coaxis of said ports piercing at an acute angle a plane containing length axes of said first and second valve assemblies.

3. The apparatus of claim 1 in which said first and second valve chambers open through first and second exterior surfaces on said body, said first and second surfaces being in different planes, such that said valve chambers are located at different heights in said body.

4. The apparatus of claim 1 in which said steam trap mechanism is at the upper end of said trap chamber, said passages and said ports being located so that flow is downward through each valve chamber and past each valve member.

5. The apparatus of claim 1 in which said first and second valve assemblies have respective length axes, said valve assembly length axes defining a common plane intersecting said first and second shared common walls.

6. The apparatus of claim 1 in which said passages communicate said first and second ports respectively with said first and second valve chambers, and each said passage extends circumferentially at least part way around said trap chamber.

7. The apparatus of claim 1 in which a said passage includes a substantially U-shaped portion between a given said valve chamber and port.

8. The apparatus of claim 7 in which two said U-shaped portions open in opposite directions and respectively communicate with opposite ends of said trap chamber.

9. The apparatus of claim 8 in which said steam trap mechanism includes a trap valve at an upper length end of said trap chamber and housed in a said passage extending up from said trap chamber between said trap chamber and said second valve chamber in a leg of the corresponding U-shape portion.

10. The apparatus of claim 9 in which said housing includes a cover removable from said body at the top of said trap chamber and including a portion of the last mentioned said passage.

11. The apparatus of claim 1 in which said housing has a cover removable from said body at the top of said trap chamber, said valve assemblies having manually actuable stems extending up out of said body through and perpendicular to a plane of separation of said cover from said trap chamber, said stems being generally parallel.

12. The apparatus of claim 1 in which said valve chambers have length axes in a first plane, said ports having length axes each intersecting said first plane at an acute angle.

13. A combination steam trap and flow valve apparatus comprising:

a compact hollow body containing a trap chamber close flanked on opposite sides by first and second valve chambers, said body having a continuous peripheral wall surrounding said first valve chamber and trap chamber and a bight wall chordally connecting opposed parts of said peripheral wall and separating said chambers, said body having an inlet port and an outlet port, said body having passages connecting said trap chamber and first valve chamber and communicating with said inlet and outlet ports;

a first valve member in said first valve chamber actuable for controlling flow thereto; and a steam trap mechanism operatively associated with said trap chamber for controlling flow therethrough.

14. The apparatus of claim 13 in which said trap chamber and said first valve chamber have side-by-side, substantially parallel, longitudinal axes.

15. The apparatus of claim 13 including a second valve member in said second valve chamber actuable for controlling flow therethrough, said body having a second bight wall chordally connecting opposed parts of said peripheral wall and separating the second valve chamber from said trap chamber.

16. A combination steam trap and flow valve apparatus comprising:

a peripheral wall substantially coaxially surrounding a trap chamber;

a peripheral wall substantially coaxially surrounding a valve chamber, said trap chamber and valve chamber peripheral walls having shared longitudinally extending portions;

a first valve member in said valve chamber actuable for controlling flow therethrough;

a steam trap mechanism operatively associated with said trap chamber for controlling flow therethrough; and a flow path through said peripheral walls and connecting said trap chamber and valve chamber.

17. The apparatus of claim 16 including a peripheral wall surrounding a port, said port communicating with said valve chamber, said port being adjacent said trap chamber with said port peripheral wall intersecting and sharing a portion with said trap chamber peripheral wall.

18. The apparatus of claim 16 including a peripheral wall surrounding a second valve chamber, said second valve chamber and trap chamber peripheral walls intersecting and having a shared portion, an additional flow path through said second valve chamber and trap chamber peripheral walls and connecting said second valve chamber and trap chamber, first and second ports communicating with said first and second valve chambers, said first and second ports having peripheral walls intersecting and shared with said trap chamber peripheral wall.

19. The apparatus of claim 18 in which said valve chambers have length axes in a first plane and said ports have length axes intersecting said first plane substantially at the length axis of said trap chamber.

20. A combination steam trap and flow valve apparatus comprising:

a housing comprising a trap chamber, a first valve chamber communicating with said trap chamber, a first port communicating with said first valve chamber, said trap chamber and first valve chamber having length axes in a first plane, said trap chamber and port having length axes in a second plane distinct from said first plane;

a first valve member in said first valve chamber; and a steam trap mechanism in said trap chamber.

21. The apparatus of claim 20 in which said first and second planes form an acute angle.

22. The apparatus of claim 20 in which said length axis of said port intersects said first plane.

23. The apparatus of claim 22 in which said length axis of said port intersects said length axis of said trap chamber.

24. The apparatus of claim 20 including a second valve chamber communicating with said trap chamber, and a second port communicating with said second valve chamber, said valve chambers having length axes in said first plane, said ports both having length axes in said second plane with said trap chamber length axis.

25. The apparatus of claim 24 in which said first and second planes intersect at an acute angle.

26. The apparatus of claim 24 in which said housing comprises a compact hollow body defining said trap chamber, valve chambers and ports, said ports opening from said body, said body being wider in said first plane than in second plane.

27. The apparatus of claim 24 in which said housing comprises a compact hollow body defining said trap chamber, valve chambers and ports, said body being wider in the plane of said valve chambers than across the outermost ends of said ports.

28. A combination steam trap and flow valve assembly, comprising a housing including a trap chamber extending longitudinally in said housing, a steam trap mechanism in said trap chamber, an inlet port and outlet port opening sidewardly in said housing, and inlet and outlet valve chambers in said housing and containing respective inlet and outlet valve members, said ports and valve chambers being spaced circumferentially with respect to each other around said trap chamber in alternating fashion.

29. The apparatus of claim 28 in which said ports are remotely circumferentially spaced and open on opposite sides of said housing, said inlet valve chamber being circumferentially adjacent said inlet port and remote from said outlet port.

30. The apparatus of claim 28 in which said ports open on opposite first and second side faces of said housing, said inlet and outlet valve chambers being circumferentially close to said inlet and outlet ports, said housing having front and rear faces circumferentially between said side faces and offset circumferentially from said ports and said valve chambers.

31. A combination steam trap and flow valve apparatus, comprising:

a housing comprising a trap chamber and first and second valve chambers, first and second ports communicating respectively with said first and second valve chambers, said valve chambers having length axes in a common first plane, at least one said port having a length axis acutely angled to said common first plane;

respective first and second valve members in said first and second valve chambers;

a steam trap mechanism in said trap chamber, in which said ports have a common length axis acutely angled to said common plane.

32. The apparatus of claim 31 in which said acutely angled axis and plane both pass through said trap chamber.

33. The apparatus of claim 31 in which said acutely angled axis and plane intersect in said trap chamber.

* * * * *